Figure 1:
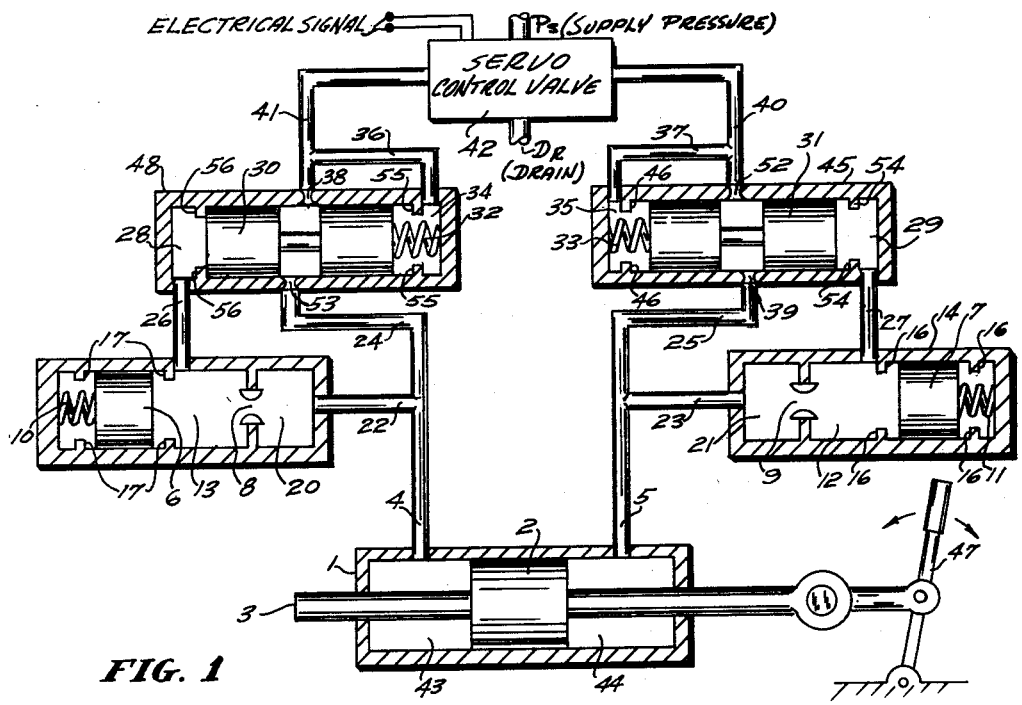

United States Patent Office 3,067,725
Patented Dec. 11, 1962

3,067,725
SAFETY DEVICE FOR A CONTROL LOADING MECHANISM
Harold S. Hemstreet, Binghamton, and Alexander Montgomery, Chenango, N.Y., assignors, by mesne assignments, to General Precision, Inc., a corporation of Delaware
Filed May 18, 1959, Ser. No. 813,879
8 Claims. (Cl. 121—38)

This invention relates to hydraulic safety devices. More particularly, it relates to means for preventing a sudden overload from being imposed on parts of a hydraulic load simulating device when other parts of the system suddenly fail to operate properly.

This invention is particularly adapted to hydraulic control loading systems, for use with aircraft simulators, such as that shown in the United States Patent No. 3,007,258, issued November 7, 1961, to Harold S. Hemstreet et al., and assigned to the same assignee as the instant invention.

There may be failures in either the hydraulic or the electrical means which make up the control loops to provide "feel" to simulated aircraft controls. Where the failure is in the hydraulic system and the electrical controls are operative, additional electrically controlled elements can usually activate safety devices to protect equipment and personnel. However, circumstances may conspire to prevent the electrical controls from functioning correctly, or a hydraulic failure may occur too rapidly for effective control by electrical means.

Among the prior art devices for dealing with this problem are those which provide direct hydraulic safety means such as that set forth in U.S. patent application No. 702,968, entitled "Hydraulic Safety Device," which was filed December 16, 1957, by Harold S. Hemstreet and and assigned to the same assignee as the instant invention. That application describes a means for stopping the flow of fluid into a control cylinder when such flow is associated with an increase in fluid pressure beyond certain limits, within the cylinder. Models of that invention perform satisfactorily, but present certain problems.

One of the chief difficulties with the foregoing invention and other prior art arises from the difficulty of manufacture. Certain orifices must be cut to very close tolerances with maximum dimensions not to exceed 0.004" in some instances and with square cut corners to present square or rectangular shapes. Either special methods, such as ultrasonic impact cutting techniques of considerable expense must be used, or else the part involved must be made by cutting it into separate pieces and machining each separately to very close tolerances, after which the pieces are copper-brazed together in a hydrogen atmosphere. Either of these alternatives leaves much to be desired; the brazing technique involves much troublesome effort to keep small holes and ports free of copper while insuring a good bond elsewhere, and the ultrasonic process gives results of dubious positional accuracy under the conditions involved. In summary, a better method and apparatus for obtaining the integrating or time-delay action of the floating piston invoved in the earlier configurations of safety devices, as set forth in the references, is needed.

During the study of working models of the prior art devices, it was noticed that they can be made to operate so as to block the flow of hydraulic fluid at high pressure to one side of the piston of the associated hydraulic actuator. They do not prevent the rapid motion of the actuator piston immediately subsequent to the operation of the safety device in arresting a failure, as a consequence of cavitation and the mechanical momentum acquired by the actuator piston during the short time required for the safety device to operate. This failure to stop the actuator piston immediately after a hydraulic failure leaves some room for damage to equipment or injury to personnel.

It is a primary object of this invention, therefore, to provide a hydraulic safety device which will effectively prevent damage to the cockpit and the personnel of aviation trainers, and other devices employing such systems, which might otherwise result from the failure of a hydraulic load simulator.

It is another object of this invention to provide a hydraulic control device which will serve to prevent damage to a hydraulic system due to failure in a part of the system, whether the failure results in an increase or a decrease in pressure.

It is a further object of this invention to provide a simple, economical control device capable of acting quickly in response to changes in pressure before the pressure builds up to dangerous differences in level, thereby preventing a hydraulic circuit from being subjected to a too large change in pressure.

It is yet a further object of this invention to provide a hydraulic safety device of greater simplicity of manufacture which will serve to prevent damage to a hydraulic system and to objects and persons around the system.

It is still another object of this invention to prevent all excessive motion of a hydraulic control system by positively arresting the motion of fluid from an actuator in the moment that a failure occurs in the system.

Figure 2:
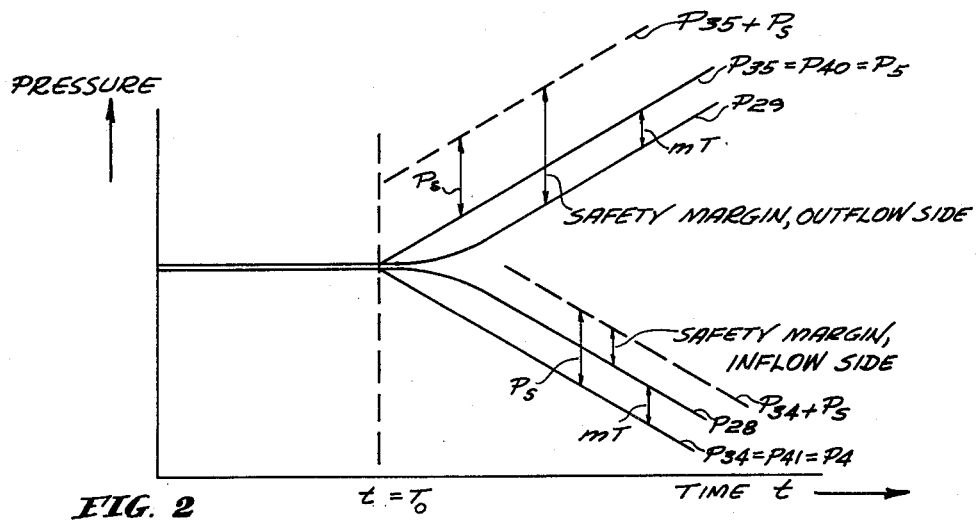
Figure 3:
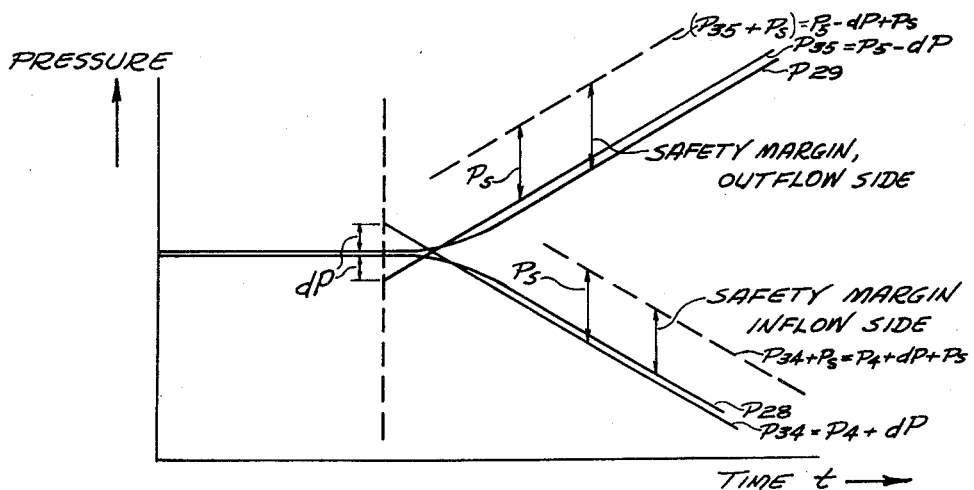

The novel features that we consider characteristic of our invention are set forth with particularity in the appended claims. The invention itself, however, both as to its organization and its method of operation, together with additional objects and advantages thereof, will best be understood from the following description of specific embodiments when read in connection with the accompanying drawings, in which:

FIG. 1 is a block diagram depicting the relationships between the hydraulic components of the instant invention, FIG. 2 is a diagram showing the relationships of pressure to time existing in the safety device of FIG. 1, FIG. 3 is a further diagram of pressure-time relationships as they exist in the device of FIG. 1 following modifications of certain elements, FIG. 4 is a further embodiment of the instant invention.

The embodiments of the invention illustrated and described in detail as follows provide an all-hydraulic system which is responsive to information contained within the system to shut the system down whenever certain abnormal conditions prevail which indicate a failure of the device. The system is arranged in such a way that certain changes in pressure within the system are considered to be normal (i.e., cause the system to operate in the desired manner) when associated with a particular mode of behaviour of the fluid and the elements comprising the system; but, similar changes in pressure associated with other modes of behaviour of the elements and fluid are considered to be abnormal and, in fact, represent a condition of failure in the system. The arrangement of the system is such that when a failure condition occurs, connections are made within the system which cause it to operate to shut off the power elements and thus prevent damage.

As is the case with the earlier devices, the complete safety device is made up of two identical safety mechanisms, one for each direction of movement of the hydraulic piston in the actuator. Each mechanism comprises a power shutoff piston and assembly, and a pressure-sensing accumulator assembly, together with suitable interconnecting passages within the housing block. Each sleeve is contained within a suitable recess, to the walls of which it is sealed by rubber O-rings or other suitable means. Relative ease of manufacture is provided in a preferred embodiment of the invention by the design of the various sleeves, each of which can be machined from bar stock in one piece. No brazing is necessary in this embodiment and troublesome small orifices are eliminated.

In understanding the operation of the safety device incorporating the invention, reference should be made to FIG. 1, which is a schematic diagram of various interconnections and operating parts including two identical safety mechanisms, one for each direction of movement of the piston of the hydraulic actuator. Each mechanism comprises a power shutoff piston assembly and a pressure-sensing floating piston assembly, together with suitable interconnecting passages within the metal block housing. Each piston slides longitudinally within an enclosing metal bushing or sleeve, to which it is fitted by honing, lapping, or other suitable process, to obtain small clearance and consequent low leakage of hydraulic fluid. Each sleeve is contained in a suitable recess in the housing block, where it is sealed by rubber O-rings or other suitable means.

It will be recalled that in many uses of a hydraulic actuator which is controlled by an associated electrical or electrohydraulic system, the actuator acts to exert a force on some external agency, which in turn exerts a reaction force on the actuator tending to return the actuator to its original position. If the actuator is stationary at some quiescent position, it will resist any force which displaces it from that position. For example, the force-simulating hydraulic actuator for a flight control, such as the control stick or rudder pedals, in a flight simulator acts to oppose any displacement of the stick from the neutral of trimmed position because of an externally-applied force by the simulator pilot. It accomplishes this by sensing the disturbance and actuating the servo control valve controlling the flow of fluid to the actuator in such a manner as to port fluid under pressure to that side of the hydraulic cylinder toward which motion takes place, generating a restoring force. Reflection will show that fluid must exit from one side of the hydraulic actuator cylinder (the side toward which the actuator piston is displaced) at an increasing hydraulic pressure, and that fluid also must enter the other side of the actuator, at falling pressure. Depending on which way the actuator piston is moved, then, a particular half of the hydraulic cylinder thus may experience either outward flow and simultaneous pressure rise or inward flow and pressure fall. It can be seen that these criteria of fluid flow and pressure rate of change apply generally in all those cases involving an actuator wherein the force exerted by the actuator via the associated system always is such as to oppose whatever force is exerted on the actuator. The safety device discussed herein may be used with all these types of equipment.

It may also happen that malfunction of some part of the system may cause fluid at high pressure to be ported in an uncontrolled manner to one side of the hydraulic cylinder, while the other side of the actuator is connected to the drain. If this happens, the piston and actuator will be driven violently to one limit of travel, with possible serious damage or personal injury. The action is characterized by fluid flow into one side of the cylinder with simultaneous rapid rise in pressure coupled with flow out of the other side at a correspondingly rapid pressure drop. Thus, there are four possible combinations of flow direction and pressure change which may occur in either half of the hydraulic actuator. They are enumerated as follows:

(1) Flow inward to cylinder at rising pressure in cylinder—Failure
(2) Flow inward to cylinder at falling pressure in cylinder—Normal operation
(3) Flow outward from cylinder at rising pressure in cylinder—Normal operation
(4) Flow outward from cylinder at falling pressure in cylinder—Failure From what has gone before, it will be clear that the occurrence of (2) and (3) above is expected in normal operation of the kind of hydraulic system for which the safety device is adapted, while the appearance of the effects (1) or (4) is to be regarded as reflecting a failure somewhere in the hydraulic system. Early models of safety devices such as that disclosed in previously discussed application Number 702,968 utilized condition (1) as the failure criterion and blocked the flow of high-pressure fluid into the hydraulic actuator to remove the driving force on the actuator piston. The safety device incorporating the invention which is the object of this disclosure uses the fourth set of conditions as a failure criterion; it senses the outward flow and simultaneous pressure drop at one side of the actuator, and uses these conditions to actuate a power shutoff piston which blocks the egress of fluid from the actuator while the condition prevails, thus preventing any motion of the actuator piston. The action takes only milliseconds and the actuator piston moves only a negligible amount before being halted. Leakage past the closed shutoff piston then causes the actuator piston to move slowly to one limit of travel, against the mechanical stops. Rapid removal of the failure condition, e.g. by restoration of power supply voltages after interruption, is sensed and arrested by the safety device as another failure, but of opposite sense. Violent reset motion of the actuator piston, therefore, does not occur; instead, the actuator piston drives slowly back to the trimmed or no-force position under complete control, after which normal operation resumes again. This invention also makes unnecessary the check valves referred to in the prior art device, which are required to remove certain anomalies in the operation of the device.

In understanding the operation of this invention, reference to FIG. 1 will be helpful. Referring to the safety mechanism on the right of the figure, it can be seen that a power shutoff piston 31 is capable of longitudinal movement within the cylinder 45 as the result of differences in the forces acting on its ends, and that, moved fully to the left against stops 46, it blocks the exit of hydraulic fluid from the region 44, which is the space within the actuator cylinder 1 and to the right of the actuator piston 2, by preventing the free flow of fluid upward through line 5 and passage 25, thence through ports 39 and 52 and passage 40 to the servo control valve and the system drain. Piston 31 is lightly spring-loaded by spring 33 to remain in the fully-open position, so that ports 39 and 52 are not covered by the body of the piston. The region 29 at the right of piston 31 is ported through passage 27 to the space 12, which may be regarded as the chamber of the previously mentioned spring-type accumulator, the piston of which is marked 7 and biased by the spring 11. Entry or egress of fluid from region 21 to the accumulator chamber 12 and regions 27 and 29 is possible only via the small orifice 9. The region to the left of piston 31 is connected through passage 37 to the line 40.

The pressure-type accumulator is composed of a simple solid piston 7 closely fitted to and sliding longitudinally within a sleeve in a cylinder 14, and being urged in the direction to reduce the volume 12 within the accumulator sleeve by spring 11, and also being restrained in its extremes of motion by stops 16. The longitudinal position of piston 7 is determined by the hydrostatic pressure in region 12, a high value of pressure moves piston 7 to the right in the diagram and compresses spring 11, while a low value reduces the force acting to the right on piston 7 and allows spring 11 to push 7 further inward. The cross-sectional area of the piston 7 and the constant of the accumulator spring 11 are so chosen that the piston is at the right extreme of its travel (spring 11 compressed) when the pressure in region 12 approaches that of the supply pressure for the system, and it is at the left limit of its travel (spring 11 expanded) when the pressure in region 12 approaches zero.

Assume that the system has been energized for a time and the actuator piston 2 is in its quiescent or resting position. With a correctly adjusted servo control valve, the pressure in line 5 and in region 21 will be approximately one-half supply pressure. Because of the presence of orifice 9, the pressure inside the accumulator and at 29 will also be at the same value. Since power shutoff piston 31 is held in the open position by spring 33, ports 52 and 39 are open and free flow along lines 40, passage 25 and line 5 is possible, so that the pressure in line 40 and region 35 is also constant at one-half of supply pressure. Now suppose that the pressure in line 5 rises from some reason. Since there are no restrictions as indicated earlier, the pressure in region 35 will also rise, almost simultaneously. On the other hand, the pressure in the accumulator at 12 can rise correspondingly only after the lapse of enough time to allow fluid flow from region 21 through orifice 9 into region 12, moving piston 7 to the right and compressing spring 11. Hence, the pressure rise in regions 12 and 29 is time-delayed behind the instantaneous rise assumed for line 5. The accumulator assembly may be considered as an analog integrator operating on the pressure in line 5 to produce that in region 29, with a time constant determined by the geometry of the accumulator. The same type of action, but in the opposite direction, takes place if the pressure in line 5 falls; the pressure in region 29 falls also, but with a definite time lag.

With these principles in mind, then, consider what happens in normal operation when the actuator piston 2 is displaced by an external force applied at 47, say to the right. Fluid is displaced outward from region 44 and upward along lines 5, passage 25, ports 39 and 52 and line 40 to a conventional servo valve 42 and the drain, with a simultaneous rise in pressure. This rise while appearing almost simultaneously at region 35, on the left of the power shutoff piston 31, arrives in region 29, at its right end, only after the time lag provided by the accumulator assembly, so that a force imbalance exists across the two ends of piston 31. It will be noted, however, that this force imbalance acts to aid spring 33 and hold piston 31 in the open position, so that no interference to the flow of fluid outward from region 44 can take place.

If piston 2 should be moved to the left instead of the right, then fluid flows downward from the source and valve 42 through lines 40 and 5 and enters region 44, with a corresponding drop in pressure. As before, the change appears quickly at the left end (region 35) of piston 31, but is time-delayed in appearing at its right end (region 29) so that momentarily a force imbalance exists across piston 31, but in a direction to force the piston toward the left to the closed position. The force exerted by spring 33, together with delays in the transmission of pressure by orifices at 39 and 52, however, acts to hold 31 in the open position throughout all normally encountered movements of the piston 2, while not interfering appreciably with the operation of the equipment under failure conditions.

An additional feature of the invention consists of means for deliberately reducing the cross-sectional area of ports 39 and 52, and 38 and 53, so that the pressure drop due to fluid flow through the shutoff pistons and sleeves between servo control valve 42 and the hydraulic actuator cylinder is not negligible, thereby permitting the use of a lower supply pressure and providing other design advantages, as well as furnishing means for operating one of the shutoff pistons in the unlikely event of the associated accumulator piston failing in operation.

The mode of operation of this invention in arresting failure may now be explained. Suppose that a failure occurs somewhere in the associated electrical control or the hydraulic systems, which causes line 41 at the left in FIG. 1 to be continuously ported to the supply pressure and line 40 to be ported to the drain. The rapid rise in pressure in line 41 which results is transmitted to region 43, and coupled with the equally rapid fall in region 44, to tend to drive piston 2 to the right in FIG. 1 with extreme violence and consequent damage or personal injury. The rapid fall in pressure in line 40 is communicated almost instantly to region 35, while being delayed by the accumulator in arriving at region 29. This means the large force imbalance arising across shutoff piston 31 is enough to overcome the counterbalancing force exerted by spring 33 and move piston 31 to the left toward the closed position. As soon as there is any appreciable throttling of the fluid flow upward through ports 39 and 52 by the closing of shutoff piston 31, the pressure in line 5 begins to rise again, while that in line 40 remains at low level. This reinforces the original unbalance so that the action becomes regenerative and ends with piston 31 held in closed position blocking further exit of fluid from region 44 so that piston 2 can no longer move. If the failure should be such that valve 42 instead acts to port line 41 to drain and line 40 to high pressure, driving piston 2 violently to the left, then power shutoff piston 30 and its accumulator piston 6 act in an exactly analogous manner to block the flow of fluid from region 43 and arrest the motion of piston 2 to the left.

Either of the two safety mechanisms will operate in the manner described regardless of actuator position at the instant of failure, and regardless of whether or not there is an external load on the actuator. If the stick 47, in the example of a flight simulator, is being grasped at the moment of failure, a sharp momentary shock is felt, after which leakage around the closed power shutoff piston allows piston 2 to be forced slowly to one limit of travel by fluid at high pressure acting on its other side.

The differential pressure developed across the two power shutoff pistons 30 and 31 for a given direction of motion of hydraulic actuator piston 2 are of opposite sense, acting to aid the threshold spring 32 or 33 of the shutoff piston carrying fluid away from the hydraulic actuator, and acting to oppose the threshold spring of the mechanism which passes fluid into the other half of the hydraulic actuator. It will be seen by what follows, in connection with FIGS. 2 and 3, tht these effects serve to equalize the respective safety margins by which the shutoff pistons are held in the open position during normal opertaion, and also allow the size of the springs to be reduced and to enhance the reliability and efficiency of the unit in halting failures.

Analysis of the effects under discussion will be aided by assuming first that the pressure drop due to fluid flow through ports 39 and 52, and 38 and 53, is negligible, after which the effect of a non-zero pressure drop will be studied. Let the instantaneous hydrostatic pressure in region 44 (the same as that in line 5) be denoted as $P_5$ in FIG. 2, and that in line 40 (same as in region 35) be denoted as $P_{40}$. Further, let the pressure in region 29 be denoted as $P_{29}$. Similarly, corresponding pressures in the opposite half of the device are denoted by $P_4$, $P_{41}$, and $P_{28}$ respectively.

Now imagine that actuator piston 2 is displaced by some external agency to the right with constant velocity, beginning at a time $T_0$. Then, because of the operation of the associated hydraulic servo elements which actuate the servo control valve 42, pressure $P_5$ will increase linearly with time, and $P_4$ will decrease linearly with time, in the manner shown in FIG. 2. The two accumulator assemblies, acting in the manner described earlier, will then cause pressures $P_{29}$ and $P_{28}$ to lag behind pressure $P_5$ and $P_4$ respectively, as indicated in FIG. 2. It can be shown that if the accumulator operates as an analog integrator with a transfer function of the form $$\frac{1}{S+1/T}$$

and if P increases linearly with time at a rate $m$, the steady-state differential pressure lag between $P_5$ and $P_{29}$ is equal to the product of $m$ and T, where T is the equivalent time constant of the accumulator. The force $F_s$ exerted by the threshold springs 32 and 33 may also be replaced for analysis by a quantity $P_s$ having dimensions of pressure and related to $F_s$ by the equation $F_s = P_s \times A_p$ where $A_p$ is the effective end surface area of the shutoff piston. It will be evident that in order for the shutoff pistons to remain open during normal operation, both of the following conditions must be staisfied:

$$P_{35}+P_s \geq P_{29}$$
$$P_{34}+P_s \geq P_{28}$$

The value $P_s$ is nearly constant for a given spring and shutoff piston, while the other quantities vary with the movement of piston 2.

The quantities involved in these equations are plotted against time in FIG. 2, and the so-called safety margins, or amounts by which $P_{29}$ is smaller than the sum of $P_{35}$ and $P_s$, and $P_{28}$ smaller than the sum of $P_{34}$ and $P_s$, are indicated in the figure. The discrepancy between the two safety margins, the large one involving the mechanism carrying outflowing fluid, and the small one involving the mechanism carrying in-flowing fluid, is evident.

Now assume that significant throttling effect exists on fluid flowing through ports 39 and 52, and 38 and 53, by reason of reduced sizes of these ports, so that a pressure drop of magnitude $dP$ is generated across each pair of shutoff ports for a fluid flow rate corresponding to the linear velocity of the piston 2 which was assumed earlier. Since pressures in lines 5 and 4, rather than those in lines 40 and 41, are sensed by the associated hydraulic servo elements, the effect of the throttled flow will be to make $P_{35}$ equal to the difference between $P_5$ and $dP$, and $P_{34}$ equal to the sum of $P_4$ and $dP$. FIG. 3 shows the various pressures and variations which result with such a flow pressure drop $dP$, for the same motion of piston 2. It can be seen that the two safety margins, formerly widely different, have been made substantially equal, which in turn permits the use of a smaller value of $P_s$ and a smaller threshold spring to generate $P_s$. In the same manner, if failure of either accumulator piston should result in the safety device failing to stop violent motion of the stick immediately, the large pressure drop $dP$ resulting from the high fluid flow rate, transmitted through the accumulator, would act on the associated shutoff piston to close it in spite of the failure of the accumulator piston or its spring.

Turning now to the embodiment of the invention illustrated in FIG. 4, it will be noted that the accumulators embodied in cylinders 14 and 15 have been replaced by other presure controlling and delaying means embodied in cylinders 124 and 125. The elements in FIG. 4 which correspond to the elements in FIG. 1 retain their original numeral designation.

In order to explain the operation of the invention as shown in FIG. 4 it would be well to turn first to the right of the figure, where it can be seen that the power shutoff piston 31 is capable of longitudinal movement within its sleeve or cylinder 45 as a result of differences in the forces acting on its ends, and that, moved fully to the left against stops 46, it blocks the exit of hydraulic fluid from region 44, which is the space within the actuator cylinder 1 to the right of the actuator piston 2, by preventing the flow of fluid upward through line 5 and passage 25, thence through ports 39 and 52 and passage 40 to the servo control valve and drain connection. Piston 31 is lightly loaded by spring 33 to remain in the fully open position so that ports 39 and 52 are not covered by the body of the piston. The region 29 at the right of piston 31 is ported through passage 27 to region 112 surrounding the narrow central portion of the floating piston 107. The region to the left of piston 31 is connected through passage 37 to the line 40.

The floating piston 107 is similar to power shutoff piston 31 except that its total longitudinal movement is smaller. It serves to sense the rate of change of pressure in line 5. To this end, region 121 to the left of piston 107 is ported to line 5 through passage 23. Cut into the wall of sleeve 124 of piston 107 are metering ports 116 and 119, in such positions that piston 107, when positioned midway between its limits of travel, uncovers equal areas of each. Both ports 116 and 119 are open into the central region 112 of piston 107. Both 116 and 119 are of such cross section as to attain the desired manner of variation of fluid flow through the port as a function of longitudinal position of piston 107. In the working model tested, the ports are of rectangular cross-section. The position and size of each is such that at the left limit of travel of piston 107, port 116 is uncovered completely and port 119 is closed completely, and vice versa. Stops 157 and 158 restrain piston 107 in its movement. Port 119 is connected, through one of the two linearizing orifices 150, whose purpose is to modify further the flow rate function just mentioned, via suitable filtering means not shown to the source of hydraulic pressure $P_s$. Port 116 is similarly connected through the other linearizing orifice 151 to the system drain. The rate of longitudinal movement of piston 107 is controlled by throttling orifice 109 in piston 107, which allows fluid to flow in a controlled manner into or out of the closed volume 111 to the right of piston 107.

With piston 107 in an intermediate position, fluid flows under pressure from the hydraulic supply through linearizing orifice 150 and port 119 into the central region 112 of piston 107. Fluid also exists from this region through port 116 and orifice 151. The hydraulic pressure in region 112 can be seen to be a function of the longitudinal position of piston 107. When centered, the uncovered area of each port equals that of the other, the flow pressure drops are identical in value, and the hydraulic pressure in region 112 is midway between supply pressure $P_s$ and drain pressure of zero, or $P_s/2$. If piston 107 is at the left extreme of travel, port 116 is fully open and 119 fully closed, so that the pressure in region 112 drops to zero; if at the right limit, pressure in region 112 is $P_s$.

Assume the pressure in line 5, which acts on the left end of piston 107, is constant at $P_s/2$, as it will be with a correctly-adjusted servo valve 42, and with the stick or actuator piston 2 not subjected to an outside force. Then piston 107 will be centered and pressure in region 112 will also be $P_s/2$, under the reasonable assumption of zero leakage. It is clear that pressure in region 111 will be $P_s/2$ as well. If the hydraulic pressure in line 5 and hence in region 121 should increase, the force on the left end of piston 107 will become greater than that on its right end, and 107 will therefore move to the right as fluid flows through orifice 109 from the decreasing volume of region 111. At the same time, the pressure in region 112 will rise. The movement of piston 107 will continue until the pressure in 112 and in 111 equals the new pressure level in 121, when motion will stop. If the pressure in 121 should fall instead of rising, the reverse action takes place, piston 107 moving to the left enough to stabilize all pressures at the new value. The constricting action of orifice 109 thus causes the pressure in region 12 to require a definite time to vary, and the action of piston 107 can be thought of as causing pressure changes in region 112 and region 29 to lag behind the corresponding changes in line 5 and region 121. Another equally valid interpretation considers the action as that of an integrator operating on line pressure 5 to produce the pressure in region 112, with a time constant determined in part by the size of orifice 109 and by the geometry of the piston assembly.

Noting that the pressure in line 5 acts on the left end of piston 107, consider what happens during normal operation of the associated hydraulic system when the hydraulic piston 2 is displaced by an external agency, say to the right. Fluid then exits from chamber 44 upward in line 5 and passage 25, through ports 39 and 52, thence along line 40 to the valve 42, which ports to the drain. Simultaneously, fluid pressure in all these lines increases and also increases in region 121. The resulting force imbalance on piston 107 causes it to move to the right, increasing the pressure in regions 112 and 29. This action requires a short time lapse, however, whereas the rise in pressure in line 40 appears almost immediately in region 35. The delay in appearance of the pressure rise at region 29 causes a momentary force imbalance to appear across the ends of power shutoff piston 31 of such direction as to hold 31 open, so that no interference results in the free flow of fluid and motion of actuator piston 2 and stick 47. If piston 2 should be moved to the left instead, fluid flows downward through valve 42 from the source through lines 40 and 5 and enters the chamber 44, with a fall in pressure. This drop in pressure in line 5 is time delayed as before in appearing at region 29, while it appears instantaneously in region 35, so that the force imbalance across piston 31 is such as to tend to force it to the left or closed position, blocking ports 39 and 52. The force exerted by spring 33, however, acts to hold 31 in the open position throughout all normally-encountered movements of the piston 2 and stick 47, while not interfering appreciably with the cooperation of the equipment under failure conditions. Constricted orifices at 52, 39, 53 and 38 serve to aid this normal operation as indicated in connection with the embodiment of FIG. 1.

The method of operation in arresting a failure may now be explained. Suppose that some breakdown occurs in the hydraulic system, or in the electrical elements controlling valve 42, associated with the device which causes servo control valve 42 to be actuated so that it ports fluid at supply pressure $P_s$ continuously in an uncontrolled manner to line 41 (at left in FIG. 4) and simultaneously ports line 40 to the drain. The resulting large outrush of low-pressure fluid from volume 44 to the drain, and the equally large inrush of fluid at high pressure into volume 43 from the source would, if not quickly arrested, drive the piston 2 and the stick 47 to the right with extreme violence. However, as explained above, the sharp drop in pressure in line 5, while communicated substantially instantaneously to the left end of piston 31, is time-delayed appreciably by the action of piston 107 as outlined previously, so that 31 is forced toward the closed position by the imbalance of forces. The resultant partial closing of ports 39 and 52 and throttling of fluid flowing through them lowers the pressure in line 40 and in region 35 even further, tending to increase the imbalance. The action is regenerative, and a triggering action similar to that of an electronic relaxation oscillator takes place ending with piston 31 fully closed and blocking the exit of fluid from region 44 to the drain. If the failure condition should arise in such a way as to cause valve 42 to port region 43 to the drain and 44 to high pressure, then power shutoff piston 30 and floating piston 106 would operate in a manner exactly analogous to that described above to shut off the exit of fluid through line 4 and arrest the motion of piston 2 as before.

The safety mechanisms will operate in the manner described regardless of actuator position at the instant of failure, and regardless or whether or not there is an external load on the actuator. If the stick 47, in the case at hand, is being grasped at the moment of failure, a sharp momentary shock is felt after which leakage around the closed power shutoff piston allows piston 2 to be forced to one limit by the high pressure fluid acting on its other side.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. In a closed-loop control system including a servo-valve, a hydraulic cylinder, and a conduit therebetween, a safety device comprising: a shut off cylinder containing a shut off piston actuable by unbalanced pressure thereacross to shut off the flow of fluid in said conduit; an accumulator cylinder having means to vary the pressure in a region thereof in accordance with the pressure in said conduit and means to limit the rate of change of pressure in said region, said region being in communication with one end of said shut off piston to provide unbalanced pressure thereacross in response to abrupt changes in the pressure in said conduit, thereby preventing violent excursions of apparatus actuated by said hydraulic cylinder.

2. In a closed-loop control system including a servo-valve, a hydraulic cylinder, and a conduit therebetween, a safety device comprising: a shut off cylinder containing a shut off piston actuatable by unbalanced pressure thereacross to shut off the flow of fluid in said conduit; and an accumulator cylinder having means to vary the pressure in a region thereof in accordance with pressure in the portion of said conduit between said hydraulic cylinder and said shut off cylinder, and means to limit the rate of change of pressure in said region, said region being in communication with one end of said shut off piston to provide unbalanced pressure thereacross in response to abrupt changes in the pressure in said conduit, thereby preventing violent excursions of apparatus actuated by said hydraulic cylinder.

3. In a closed-loop control system including a servo-valve, a hydraulic cylinder, and a conduit therebetween, a safety device comprising: a shut off cylinder containing a shut off piston actuable by unbalanced pressure thereacross to shut off the flow of fluid in said conduit, one end of said shut off piston being in communication with the portion of said conduit between said servo-valve and said shut off cylinder; an accumulator cylinder having means to vary the pressure in a region thereof in accordance with the pressure in said conduit, and means to limit the rate of change of pressure in said region, said region being in communication with the other end of said shut off piston to provide unbalanced pressure thereacross in response to abrupt changes in the pressure in said conduit, thereby preventing violent excursions of apparatus actuated by said hydraulic cylinder.

4. In a closed-loop control system including a servo-valve, a hydraulic cylinder, and a conduit therebetween, a safety device comprising: a shut off cylinder containing a shut off piston actuable by unbalanced pressure thereacross to shut off the flow of fluid in said conduit, one end of said shut off piston being in communication with the portion of said conduit between said servo-valve and said shut off cylinder; an accumulator cylinder having means to vary the pressure in a region thereof in accordance with the pressure in the portion of said conduit between said hydraulic cylinder and said shut off cylinder, and means to limit the rate of change of pressure in said region, said region being in communication with the other end of said shut off piston to provide unbalanced pressure thereacross in response to abrupt changes in the pressure in said conduit, thereby preventing violent excursions of apparatus actuated by said hydraulic cylinder.

5. In a hydraulic system including a servo-valve, a hydraulic cylinder, and a conduit therebetween, a safety device comprising: a shut off cylinder containing a shut off piston actuable by unbalanced pressure thereacross to shut off the flow of fluid in said conduit, one end of said shut off piston being in communication with said conduit; an accumulator cylinder having means to vary the pressure in a region thereof in accordance with the pressure in said conduit, and means to limit the rate of change of pressure in said region, said region being in communication with the other end of said shut off piston to provide unbalanced pressure thereacross in response to abrupt changes in the pressure in said conduit, thereby preventing violent excursions of apparatus actuated by said hydraulic cylinder.

6. In an artificial control force system including a servo-valve, a hydraulic cylinder, and a conduit therebetween, a safety device comprising: a shut off cylinder in said conduit; a shut off piston in said shut off cylinder actuable by unbalanced pressure in a region thereof to shut off fluid flow in said conduit; an accumulator cylinder; means for varying the pressure in the region of said accumulator cylinder in accordance with the pressure in said conduit, said region of said accumulator cylinder communicating with said region of said shut off cylinder; and means for limiting the rate of variation of pressure in said region of said accumulator cylinder, whereby unbalanced pressure in said region of said shut off cylinder, supplied from said region of said accumulator cylinder, actuates said shut off piston in response to abrupt changes in the pressure in said conduit.

7. In an artificial control force system including a servo-valve, a hydraulic cylinder, and a conduit therebetween, a safety device comprising: a shut off cylinder in said conduit; a shut off piston in said shut off cylinder actuable by unbalanced pressure between a first region thereof and a second region thereof to shut off fluid flow in said conduit, said second region being in communication with said conduit; an accumulator cylinder; means for varying the pressure in the region of said accumulator cylinder in accordance with the pressure in said conduit, said region of said accumulator cylinder communicating with said first region of said shut off cylinder; and means for limiting the rate of variation of pressure in said region of said accumulator cylinder, whereby unbalanced pressure between said first and second regions of said shut off cylinder actuates said shut off piston in response to abrupt changes in the pressure in said conduit.

8. A safety device for a hydraulic system of the type which includes a control valve, an actuator, and a supply line therebetween, comprising: a shut off cylinder containing a shut off piston which blocks said supply line in a first position and opens said supply line in a second position; an accumulator cylinder connected to said supply line and containing a chamber in which the fluid pressure varies in accordance with the supply line pressure, and a time delay means for limiting the rate of change of pressure in said chamber; and a line connecting said chamber to said shut off piston adjacent one end of said shut off piston, whereby the pressure in said chamber drives said shut off piston into said first position in response to abrupt changes of pressure in said supply line.

References Cited in the file of this patent

UNITED STATES PATENTS

| | | |
|---|---|---|
| 1,609,472 | Heil et al. | Dec. 7, 1926 |
| 2,411,392 | Saville | Nov. 19, 1946 |
| 2,614,537 | Starr | Oct. 21, 1952 |
| 2,664,106 | Livers | Dec. 29, 1953 |
| 2,745,499 | Berninger et al. | May 15, 1956 |
| 2,851,795 | Sherman | Sept. 16, 1958 |
| 2,860,607 | Orloff | Nov. 18, 1958 |
| 2,906,246 | Di Tirro et al. | Sept. 29, 1959 |

FOREIGN PATENTS

| | | |
|---|---|---|
| 603,795 | Great Britain | June 23, 1948 |